Sept. 29, 1959 L. E. DEAN ET AL 2,906,784
HYDROGENATION OF UNSATURATED COMPOUNDS PRESENT IN HYDROCARBONS
Filed June 26, 1956
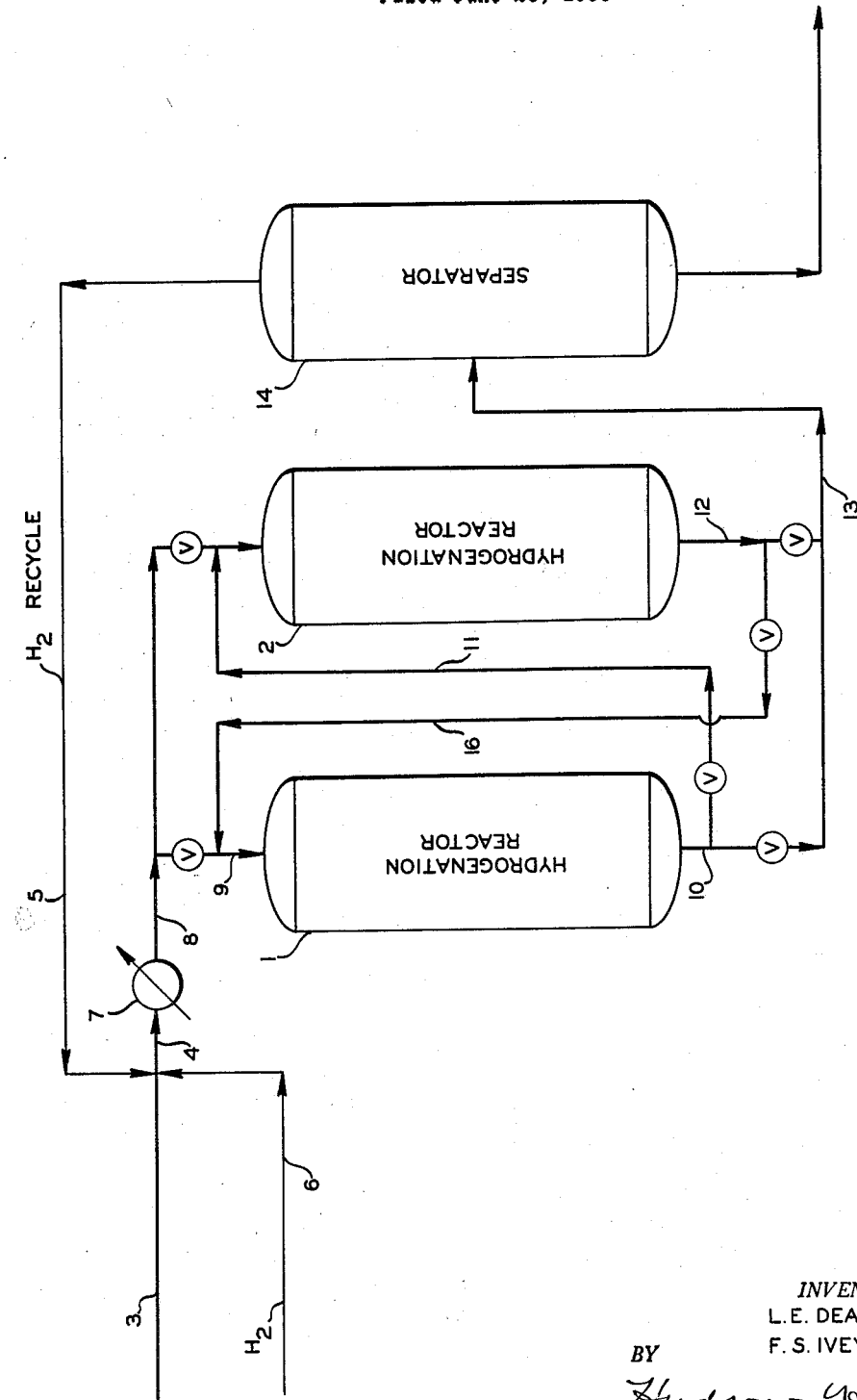
INVENTORS
L. E. DEAN
F. S. IVEY
BY
*Hudson & Young*
ATTORNEYS

United States Patent Office

2,906,784
Patented Sept. 29, 1959

2,906,784

HYDROGENATION OF UNSATURATED COMPOUNDS PRESENT IN HYDROCARBONS

Lloyd E. Dean and Fred S. Ivey, Bartlesville, Okla., assignors to Phillips Petroleum Company, a corporation of Delaware Application June 26, 1956, Serial No. 594,056

16 Claims. (Cl. 260—667)

This invention relates to the hydrogenation of unsaturated compounds present in hydrocarbons. In one of its aspects, this invention relates to the hydrogenation of benzene present in a hydrocarbon stream obtained from a natural gasoline in a two-stage process in which, in a first stage, hydrogenation is catalytically accomplished until such time as the catalyst is no longer desirably active for hydrogenation following which in said stage removal of sulfur from the hydrocarbon stream is practiced, and the hydrogenation is conducted in a second stage under hydrogenation conditions until the catalyst in the said second stage becomes undesirably active for hydrogenation following which catalyst in the first stage is renewed or reactivated for hydrogenation to be carried out there and the second stage is used for sulfur removal as was practiced in said first stage after it was no longer desirable to hydrogenate therein. In another aspect of the invention, it relates to the hydrogenation of benzene present in a mixture of hydrocarbons which has been separated from natural gasoline and which contains methylcyclopentane, normal hexane, isohexane, and heptane. In a still further aspect of the invention, the temperature in each of the stages or zones is correlated with the activity of the catalyst therein resulting in a gradually increasing temperature during hydrogenation. Still further, in another aspect of the invention, the temperature of a stream of gases from which sulfur-containing compounds have been removed, as described herein, is reduced in amount correlated with the activity of the hydrogenation catalyst to which the stream is fed.

The invention will be described in connection with the production of cyclohexane. It will be understood that the invention can be applied by one skilled in the art in possession of this disclosure to other streams.

It is known that cyclohexane is used in large quantities in the production of certain synthetic fibers. Normally, cyclohexane is obtained by a separation of it from other close-boiling hydrocarbons. It has been customary to obtain an 85 percent cyclohexane stream, containing for the most part of its remainder, hydrocarbons which are close-boiling. The benzene concentration in the finished product has been held to required specifications by removing benzene with the off-streams. Increasing demand for cyclohexane of higher purity has necessitated the manufacture of additional cyclohexane by synthetic means. When such means are employed, benzene cannot be readily removed in off-streams without the excessive loss of other valuable feed stocks, making benzene removal by this means uneconomical and, therefore, unattractive. The presence of benzene in the feed to a synthesis plant increases consumption of the synthesis catalyst. Also, the presence of benzene inhibits some of the desirable reactions by an uneconomical amount. By removing the benzene from the feed stock to such catalyst, greater yields of desirable products are obtained from the synthesis plant with lower catalyst consumption and, therefore, lower and more attractive operating costs.

It is an object of this invention to hydrogenate unsaturated compounds present in a stream of hydrocarbon compounds. It is another object of this invention to increase the desirable amount and/or purity of cyclohexane present in a stream of hydrocarbons containing the same. A further object of the invention is in the provision of a process for the hydrogenating of an unsaturated compound such as benzene contained in a stream of hydrocarbons in such a manner as to improve the effective life of the hydrogenation catalyst.

Other aspects, objects and advantages of the invention are apparent from a consideration of this disclosure, the drawing and the appended claims.

According to this invention, benzene or an equivalent unsaturated hydrocarbon is converted in a stream of hydrocarbons containing it and undesirable sulfur compounds, which are undesirable because these tend to poison the catalyst in the process or in another process in which the product of this process is used, by passing the stream into a primary zone into contact therein with a hydrogenating catalyst under hydrogenation conditions and therein hydrogenating said benzene and said stream until the catalyst therein is substantially inactivated for further desirable hydrogenation of benzene in said stream, continuing to pass said stream into contact with said catalyst substantially inactivated for benzene hydrogenation but, according to the invention, still active for sulfur-compound conversion, under sulfur conversion conditions to remove sulfur compounds existing in said stream. Further, according to the invention, when the catalyst in said primary zone is no longer active for desirable hydrogenation and has been placed upon sulfur conversion operation, the stream treated in said primary zone and from which sulfur compounds have been substantially converted is then passed to a secondary zone in which hydrogenation of the unsaturated compound or benzene is practiced until such time as the catalyst in said secondary zone is no longer desirably active for hydrogenation. Then, the secondary zone is placed under sulfur-compound conversion operation conditions and the primary zone, with its catalyst renewed or reactivated, is placed once again under hydrogenation conditions and the discharge stream from the secondary zone is passed to the said primary zone. Also, according to the invention, the temperature in each of said zones is gradually increased when each of said zones is under hydrogenation conditions.

Ordinarily, the mixture of hydrocarbons, which in a specific example, contains about 22 percent methylcyclopentane, 60 percent normal hexane, 12 percent isohexanes, 3 percent benzene, and about 3 percent heptanes is mixed with hydrogen, heated to about 400 to 500° F. and passed through two catalyst cases in series, wherein the benzene is hydrogenated to cyclohexane, cooled and flashed. The effluent vapors from the flash are passed back into the feed and the liquid from the flash is stripped of hydrogen and light ends before passing to the synthesis plant where normal hexane is isomerized to isohydrocarbons and the methylcyclopentane is isomerized to cyclohexane. Unless the benzene is removed from the feed to the synthesis plant, the consumption of catalyst therein will be increased by about 600 percent. Also, the conversion of normal hexane to isohexane will be decreased by about 75 percent. The effluent from the isomerization process is fractionated or separated by known methods to produce a hydrocarbon stream consisting substantially of only cyclohexane.

In one embodiment of the invention, and in the embodiment being described, each catalyst case contains a nickel hydrogenation catalyst. The yield from the catalyst, before it becomes inactive for hydrogenation, can be increased by starting the initial hydrogenation of the benzene in the feed at about 400° F. and increasing to a maximum inlet temperature of about 500° F. Since the reaction of the benzene with the hydrogen is exothermic, the temperature of the hydrocarbons passing through the catalyst bed will be increased. Also, the higher the percent of benzene present in the hydrocarbons, the higher will be the temperature of the hydrocarbons leaving the said catalyst case. With about 3 percent benzene in the feed, the reaction temperature rise experienced is about 60° F. Effluent from each catalyst bed is analyzed from time to time to determine the percent of benzene present in the effluent from each case. Benzene is maintained below about 0.1 percent and more preferably is completely hydrogenated. In one form of the invention, and in the embodiment which is being described as a specific example thereof, when the concentration of benzene begins to show up in the effluent from the first reactor, the temperature of the feed entering the reactor is increased. Ordinarily, a slight increase of temperature of the feed will result in elimination of the benzene present in the effluent. However, after continued operation in the manner described, benzene will again appear in the effluent from the first reactor. Each time benzene reappears, the temperature of the feed to the first reactor is again increased. This cycle of operations is repeated until the temperature of the effluent from the reactor has reached approximately 560 to 565° F. All this time, effluent from the reactor is being passed to separation means to recover hydrogen to be recycled. When the catalyst in the first stage or case is no longer desirably active for hydrogenation, the temperature of the feed to the first reactor or case is decreased to about 400° F. and the effluent of lower temperature from the first reactor is then passed into the second reactor or case. The second reactor is now operated as was the first reactor.

The catalyst in the first reactor is replaced in time that the feed can be passed from the second reactor into the first reactor just as the concentration of benzene in the effluent from the second reactor becomes greater than is tolerable. Again, as described in connection with the treatment of the feed to the first reactor, the temperature is reduced to about 400° F.

When the hydrogenation reaction has been shifted from the first reactor or case to the second reactor or case, the first reactor is still of use as a conversion zone to practice sulfur removal, thereby increasing the life of the catalyst in the second reactor or case. Sulphur compounds in the feed react with the nickel catalyst, forming nickel sulfide. It is this formation of nickel sulfide which constitutes the measure mechanism of catalyst deactivation when nickel is a component of the catalyst. It will be noted that as the temperature of the feed is increased through the range of approximately 400° F. to approximately 500° F. to offset declining hydrogenation activity in the second reactor, the sulfur-removing ability of the first reactor in the series, through which said feed passes after it has been heated, is increased. Thus, it is within the scope of the invention to either heat the effluent from the first reactor before it enters the second reactor to gradually increase the temperature thereof as hydrogenation activity in the second reactor gradually declines or to heat the feed at a point preceding the first reactor and thereby increase the sulfur removing ability of the first reactor to prepare a pure feed stock for the second reactor. Thus, the reaction chambers or cases can be arranged so that as the hydrogenation of the benzene occurs, during the operation of the process, a reaction front travels through the catalyst beds wherein most of the benzene hydrogenation reaction is occurring. It is desirable to have as much of the desulfurization reaction occur behind this front in the catalyst bed so that the hydrogenation is being effected largely at a place at which there is a considerably reduced sulfur content in the feed. Thus, by increasing the temperature of the feed, more of the desulfurization occurs upstream of the front where the hydrogenation of benzene is occurring, which results in the activity of the catalyst for the hydrogenation of benzene being maintainable for a longer time at a higher level. By operating in the manner described, the pounds of benzene hydrogenated per pound of hydrogenation catalyst consumed is considerably increased, as will be evident to one skilled in the art.

While in the foregoing specific example of one operation of the hydrogenation of a specific stream in the presence of a specific catalyst in a specifically described manner has been set forth, it will be clear to one skilled in the art in possession of this disclosure that equivalent streams and equivalent catalysts are within its scope.

Referring to the drawing, there are shown two zones, numbered 1 and 2 respectively. A feed such as described, is passed by way of pipe 3 into pipe 4 and recycle hydrogen from line 5 and fresh hydrogen from line 6 are added to the feed. The mixture of feed and hydrogen is passed through heat exchanger 7 and through line 8 into line 9 and then into zone 1 where hydrogenation of the benzene occurs over a nickel catalyst. This zone is operated employing a hydrogenation catalyst and at a temperature to substantially completely hydrogenate undesirable benzene in the feed. The effluent from zone 1 is passed through line 10 into line 13 and then into separation zone 14 wherein hydrogen is separated. The hydrogen from zone 14 is recycled back into line 4. The temperature of the feed entering zone 1 is initially 400° F. and the temperature of the effluent passing through line 10 is about 460° F. When benzene appears in the effluent from zone 1, the temperature of the feed entering zone 1 is increased. When the temperature of the effluent from zone 1 is increased to about 560° F., the effluent from zone 1 is passed through line 11 and into zone 2. This is the beginning of a new cycle. When the effluent from zone 1 is switched to zone 2, the temperature of the feed entering zone 1 is decreased to 400° F. The effluent from zone 2 passes through line 12, line 13 and into separator 14 wherein hydrogen is separated from the other hydrocarbons and recycled through line 5 back into the feed to the hydrogenation system. Any time an excessive concentration of benzene appears in the effluent from zone 2, the temperature of the feed to zone 1 is increased a few degrees. This increase in temperature of the feed to zone 1 will decrease the concentration of benzene in the effluent from zone 2. When the temperature of the effluent from zone 2 has reached about 560° F., the catalyst in zone 1 is quickly removed and new catalyst inserted therein. Next the effluent from zone 2 is passed from line 12 into line 16 and enters zone 1 through line 9. The temperature of the feed to zone 2 at this time is decreased to 400° F. This is the end of the cycle.

Timing of the replacement of catalyst in zones 1 and 2 may be performed by placing about 4 or 5 thermocouples in each of about three levels in each zone in each catalyst bed. There is a high temperature wave front which passes through each zone. The time when a wave front passes the thermocouples in one level of a zone can be determined by reading the temperature of the thermocouples. When the wave front has proceeded through one zone to within 1–3 feet of the bottom of a zone, the catalyst in the upstream zone is removed and new catalyst inserted in the upstream zone. Next the effluent from the zone on stream is passed into the zone with new catalyst and the temperature of the feed is reduced, as previously mentioned, to 400° F.

When treating feed of the aforementioned composition, it is necessary to change the catalyst in a zone about every 7 months. This results when feeding 11,000,000 s.c.f.d. of feed containing about 3 percent benzene through a 7 ft. diameter reactor, 42 ft. in depth, which contains two separate beds of catalyst and where each bed of catalyst is about 14 ft. thick. The hydrogen in the feed is about 200 percent in excess of that which is theoretically required to hydrogenate the benzene present in the feed. The reactors are operated at 435 p.s.i.g.

The process of the present invention may be applied when using more than two hydrogenation vessels in series. When the concentration of benzene in the effluent from the catalyst in the reactor that was last put on stream has become excessive and the temperature of the effluent has been increased to about 560° F., the reactor, the catalyst of which has been on stream the longest, is removed from the upstream end of the series, emptied, new catalyst charged therein, put back on the downstream end of the line and the temperature of the feed to the reactors decreased to 400° F. as previously described.

Reasonable variation and modification are possible within the scope of the foregoing disclosure, drawing, and the appended claims to the invention, the essence of which is that a stream of hydrocarbons containing unsaturated hydrogenatable hydrocarbon, such as benzene, and a sulfur-containing compound which acts to poison the hydrogenation catalyst which is employed which comprises hydrogenating said stream under hydrogenating conditions in a first zone but gradually increasing temperature in a preferred form, correlated with the gradual loss of activity of the catalyst until said catalyst is no longer desirably active for hydrogenation of said stream, then continuing to pass said stream through said first zone under conditions maintained to convert sulfur containing compounds in said stream, passing said stream to a second zone, and therein catalytically hydrogenating said stream as described in connection with said first-mentioned zone until the catalyst in said second zone is no longer desirably active to hydrogenate said stream, then placing said second zone under sulfur compound-conversion conditions as described for said first zone, placing said first zone under hydrogenation conditions with catalyst desirably active for hydrogenation and passing said stream from said second zone to said first zone has been set forth as above described. Although it is not necessary to correlate the temperature as described, this is preferably done for the reasons outlined in the foregoing description. It is not necessary that the catalyst be the same in each of the zones although this is now preferred for reasons of economy of time and expense in handling catalyst.

We claim:

1. The hydrogenation of benzene in a stream of hydrocarbons containing the same, the conversion of sulfur-containing compounds and the removal of the sulfur compounds formed, which comprises contacting said stream of hydrocarbons in a first zone with a fixed-bed hydrogenation catalyst, which has become substantially inactivated for hydrogenation of said stream but which is a catalyst effective to remove sulfur compounds from said stream, at a temperature at which said inactivated catalyst will convert sulfur compounds and remove the sulfur compounds formed from said stream and then in a second zone contacting said stream, after contacting it with said inactivated catalyst, with another fixed-bed hydrogenation catalyst active to hydrogenate the benzene in said stream and therein hydrogenating said benzene.

2. The hydrogenation of benzene in a stream of hydrocarbons containing it which comprises in a primary zone contacting said stream with a fixed-bed hydrogenating catalyst which is effective to remove sulfur compounds under hydrogenation conditions including increasing temperature and therein hydrogenating said benzene in said stream until the catalyst in said fixed bed is substantially inactivated for further desirable hydrogenation of benzene in said stream, reducing the temperature of the stream continuing to pass said stream into contact with said catalyst in said fixed bed, now substantially inactivated for benzene hydrogenation of said stream under sulfur compound conversion conditions to remove sulfur compounds therefrom and after sulfur compound removal, contacting the effluent in a secondary zone with a hydrogenation catalyst under hydrogenation conditions under which benzene in said stream is hydrogenated.

3. A process according to claim 2 wherein, when the catalyst in the secondary zone is substantially no longer active for desirable hydrogenation of benzene in said stream under conditions including increasing temperature, the catalyst in the primary zone is replaced with an active hydrogenation catalyst, the temperature of said stream passing through said secondary zone is reduced, passing of the stream of hydrocarbons passing through said secondary zone is continued under sulfur compound removal conditions and the stream is then passed from said secondary zone into said primary zone to hydrogenate benzene in said stream under gradually increasing temperature.

4. A process according to claim 2 wherein the catalyst is a nickel catalyst, wherein, during the hydrogenation as the catalyst is gradually deactivated for hydrogenation of the benzene in said stream, as can be judged by determining the benzene in the effluent from said zone, the temperature of the contacting of said stream with said catalyst is gradually increased to obtain an effluent within the approximate range 400 to 565° F. thus to maintain effective hydrogenation of benzene as the catalyst is being deactivated for benzene hydrogenation.

5. A process according to claim 4 wherein when the catalyst has become deactivated for benzene hydrogenation the temperature of the stream to said primary zone is reduced to approximately 400° F. and upon leaving said primary zone the effluent is passed into a secondary zone into contact with a hydrogenation catalyst and the benzene remaining in said stream is hydrogenated therein under gradually increasing temperature conditions.

6. A process according to claim 5 wherein, during the hydrogenation of benzene in said stream in said secondary zone, the temperature of the stream is raised gradually to obtain an effluent temperature within the approximate range 400 to 565° F. to maintain desirable hydrogenation of benzene in said stream as can be judged by determining benzene in the effluent from said zone.

7. A process according to claim 6 wherein, when the catalyst in the secondary zone is no longer active to desirably hydrogenate benzene in said stream, the catalyst in the primary zone is replaced with catalyst active to hydrogenate benzene in said stream, said stream continues to pass through said secondary zone under sulfur removal conditions, the temperature of the feed to said secondary zone is reduced to approximately 400° F. and effluent of reduced temperature from said secondary zone is passed into said primary zone and therein the benzene in said stream is hydrogenated under gradually increasing effluent temperature.

8. A process according to claim 6 wherein the temperature increase of the stream is accomplished before it enters the primary zone thereby aiding sulfur removal therein.

9. A process according to claim 1 wherein the stream contains methylcyclopentane, hexanes, a small portion of heptanes, and benzene is present therein in a small amount.

10. A process according to claim 1 wherein the catalyst is a nickel catalyst.

11. The purification of a stream of hydrocarbons containing an unsaturated hydrogenatable hydrocarbon, such as benzene, and a sulfur-containing compound which acts to poison a hydrogenation catalyst which is employed and which is effective to remove sulfur from said stream which comprises hydrogenating said stream under hydrogenation conditions in a first zone with gradually increasing temperature correlated with the gradual loss of activity of the catalyst until said catalyst is no longer desirably active for hydrogenation of said stream, then continuing to pass said stream through said first zone under conditions maintained to remove sulfur-containing compounds from said stream, passing said stream to a second zone and therein catalytically hydrogenating said stream as described in connection with said first-mentioned zone until the catalyst in said second zone is no longer desirably active to hydrogenate said stream, then placing said second zone under sulfur compound recovery conditions as described for said first zone, placing said first zone under hydrogenation conditions with catalyst desirably active for hydrogenation and passing said stream, from said second zone to said first zone.

12. A process according to claim 11 wherein the temperature of the stream leaving said second zone before it enters said first zone is reduced correlated with the activity of the catalyst in said first zone.

13. A process according to claim 12 wherein the catalyst is a catalyst having the hydrogenating characteristics of nickel hydrogenation catalyst, wherein the temperature varies in the approximate range 400–565° F.; and wherein the stream initially contains benzene in a small amount and is obtained from a natural gasoline.

14. A process according to claim 1 wherein the stream contains methylcyclopentane, the benzene is present in a small amount and wherein after the benzene has been hydrogenated to cyclohexane, the effluent is passed to a synthesis plant wherein the methylcyclopentane is catalytically isomerized to additional quantities of cyclohexane.

15. The hydrogenation of a stream of hydrocarbons containing sulfur compounds and a small amount of benzene which comprises passing said stream at an initial benzene hydrogenation temperature of the order of 400° F. into contact with a fixed-bed nickel-containing hydrogenation catalyst which becomes inactivated for hydrogenation due to sulfur poisoning, gradually increasing the temperature of said stream substantially as the detectable benzene in the hydrogenation effluent increases due to some sulfur poisoning of the catalyst, until a hydrogenation effluent temperature not substantially greater than about 565° F. is reached, then lowering the temperature of said stream to a temperature of the order of 400° F. while still continuing to pass the same through said catalyst, thus to remove sulfur compounds therefrom and passing the effluent from the lowered temperature sulfur-removal step just recited to another fixed-bed, nickel-containing hydrogenation catalyst to remove benzene from said stream under gradually increasing temperature of the stream as it enters the first-mentioned fixed-bed and, therefore, as it will enter said another fixed-bed but for a longer period of time since now a considerably reduced sulfur content stream is being hydrogenated in said another fixed-bed containing catalyst.

16. A method according to claim 15 wherein the benzene is contained in a stream also containing methylcyclopentane, normal hexane, isohexane and heptanes, and wherein the benzene is present in a small amount.

References Cited in the file of this patent

UNITED STATES PATENTS

| | | |
|---|---|---|
| 2,481,921 | Gwynn | Sept. 13, 1949 |
| 2,757,128 | Hemminger | July 31, 1956 |
| 2,758,059 | Berg | Aug. 7, 1956 |
| 2,769,753 | Hutchings et al. | Nov. 6, 1956 |
| 2,821,561 | Pevere et al. | Jan. 28, 1958 |